(No Model.)
L. MYERS.
VEHICLE.
No. 486,884. Patented Nov. 29, 1892.
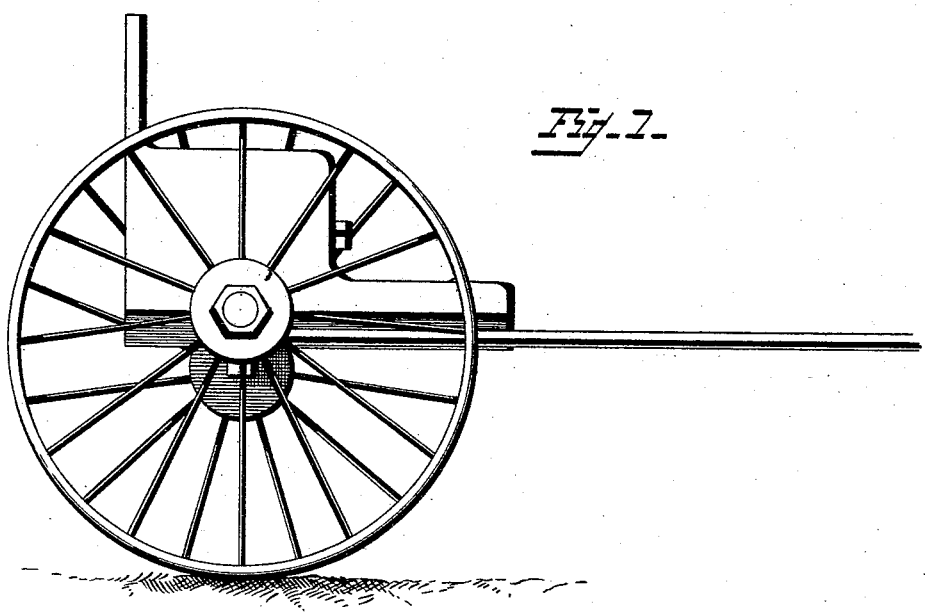
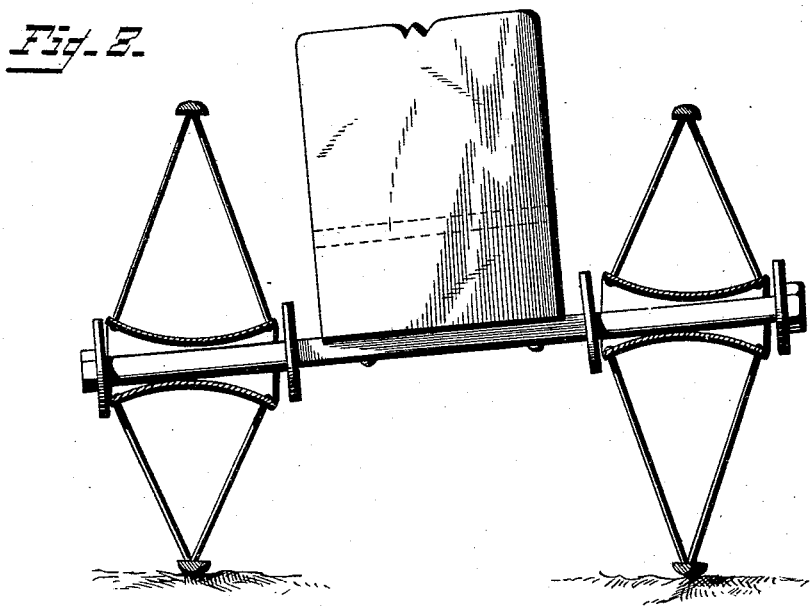
Witnesses
Albert Speiden
Carroll J. Webster
Inventor
Luther Myers
By his Attorney
William Webster

UNITED STATES PATENT OFFICE.

LUTHER MYERS, OF MAUMEE, OHIO.

VEHICLE.

SPECIFICATION forming part of Letters Patent No. 486,884, dated November 29, 1892.

Application filed July 5, 1892. Serial No. 438,885. (No model.)

*To all whom it may concern:*

Be it known that I, LUTHER MYERS, of Maumee, county of Lucas, and State of Ohio, have invented certain new and useful Improvements in Vehicles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to vehicles, and has for its object to construct a vehicle in which the body supported upon the gear shall have an undulatory motion or laterally-swaying movement.

The invention consists in the parts and combination of parts hereinafter described, and pointed out in the claims.

In the drawings, Figure 1 is a side elevation of a cart embodying my invention. Fig. 2 is a sectional rear elevation, the rear portion of the wheels being removed to disclose the novel feature of the hub-bearing.

1 designates the wheels, each of which is formed with hubs 2, arranged eccentrically to the rim 3. Each hub is formed with an inwardly-inclined surface 4 4, which forms a convex bearing upon which the axle-journals 5 of the axle 6 bear, the axles being provided with shoulders 7 of a greater diameter than the enlarged inner end of the hub, and the axle journal or spindle is furnished with a nut 8, having a flange portion 9 of greater diameter than the outer enlarged end of the hub, so that the wheel is confined between the shoulder 7 and the flange 9. Upon the axle is supported a box 10 of any desired construction to support an occupant, and to the axle is attached means for drawing the vehicle, as a pole or thills. When motion is given to the vehicle, the action upon the box gives the same a laterally-swaying motion as the wheels are set to revolve with the eccentricity in opposition to each. The convex bearing-surface within the hub allows the axle journal or spindle to assume the proper inclination therein to permit the swaying motion to the box, as shown in Fig. 2.

The vehicle affords great amusement when one or more persons are seated within the box and are being drawn forward by reason of the undulatory or swaying motion given to the box and consequently to the occupants.

While I have shown my invention as applied to a cart it can be equally well adapted to vehicles having four wheels. I may, if desired, form the axles with concave bearings and the hubs with straight cylinders to which the spokes are secured without departing from the spirit of my invention.

While I have shown a box for containing the occupant, I may mount an image or a body in configuration of an animal or burden-bearing subject, if desired.

What I claim is—

1. In a vehicle, an axle and wheels eccentrically journaled thereon formed with hubs having a longitudinally-variable bearing-surface.

2. In a vehicle, wheels, in combination with an axle journaled therein eccentrically, the eccentricity of the wheels being in opposition to each other, whereby the axle is given a laterally-rocking motion.

In testimony that I claim the foregoing as my own I hereby affix my signature in presence of two witnesses.

LUTHER MYERS.

Witnesses:
WILLIAM WEBSTER,
CARROLL J. WEBSTER.